United States Patent
Lim et al.

(10) Patent No.: US 9,259,882 B2
(45) Date of Patent: Feb. 16, 2016

(54) METHOD FOR MANUFACTURING METAL/COMPOSITE HYBRID WHEEL FOR VEHICLE AND METAL/COMPOSITE HYBRID WHEEL MANUFACTURED BY THE SAME

(75) Inventors: Tae Seong Lim, Gyeonggi-do (KR); Min Soo Kim, Seoul (KR); Seung Hwan Chang, Seoul (KR); Seong Hwan Yoo, Gyeonggi-do (KR)

(73) Assignees: Hyundai Motor Company, Seoul (KR); Chung-Ang University Industry-Academy Cooperation Foundation, Seoul (KR)

( * ) Notice: Subject to any disclaimer, the term of this patent is extended or adjusted under 35 U.S.C. 154(b) by 493 days.

(21) Appl. No.: 12/955,177

(22) Filed: Nov. 29, 2010

(65) Prior Publication Data

US 2012/0043014 A1  Feb. 23, 2012

(30) Foreign Application Priority Data

Aug. 18, 2010 (KR) .................. 10-2010-0079994

(51) Int. Cl.
*B29C 43/18* (2006.01)
*B29C 70/46* (2006.01)
*B29C 70/76* (2006.01)
(Continued)

(52) U.S. Cl.
CPC ............ *B29C 70/462* (2013.01); *B29C 70/766* (2013.01); *B29C 70/76* (2013.01); *B29C 70/78* (2013.01); *B29K 2307/04* (2013.01); *B29L 2031/32* (2013.01)

(58) Field of Classification Search
CPC ..... B29C 70/462; B29C 70/766; B29C 70/78; B29K 2307/04; B29L 2301/32
USPC .......................................... 156/245
See application file for complete search history.

(56) References Cited

U.S. PATENT DOCUMENTS 4,153,657 A * 5/1979 Wilcox .................. 264/46.6
4,851,177 A * 7/1989 Gray ..................... 264/297.6
(Continued)

FOREIGN PATENT DOCUMENTS

EP   1147869 A1 * 10/2001
JP   60-080902 A    5/1985
(Continued)

OTHER PUBLICATIONS

Kim et al., "Investigation of cure cycle for co-cured metal/composite hybrid structures without fabricating thermal residual stress", pp. 83-87.

*Primary Examiner* — Philip Tucker
*Assistant Examiner* — Vicki Wu
(74) *Attorney, Agent, or Firm* — Mintz Levin Cohn Ferris Glovsky and Popeo, P.C.; Peter F. Corless

(57) ABSTRACT

The present invention provides a method for manufacturing a metal/composite hybrid wheel for a vehicle by molding an inner rim of a composite material by compression and, at the same time, bonding an outer rim of a metal material to the inner rim to induce compressive residual stress in the bonding area by a difference in thermal expansion coefficient between the outer rim and the inner rim, thereby increasing the adhesive strength of the bonding area and the durability of the wheel. The present invention further provides a metal/composite hybrid wheel for a vehicle manufactured by the method.

11 Claims, 8 Drawing Sheets

(51) Int. Cl.
*B29C 70/78* (2006.01)
*B29K 307/04* (2006.01)
*B29L 31/32* (2006.01)

(56) References Cited

U.S. PATENT DOCUMENTS

| | | | | |
|---|---|---|---|---|
| 5,316,834 | A | * | 5/1994 | Matsuda et al. ............... 442/247 |
| 5,639,416 | A | * | 6/1997 | Pennisi et al. ................. 264/571 |
| 5,783,278 | A | * | 7/1998 | Nishimura et al. ............ 428/102 |
| 6,073,991 | A | | 6/2000 | Naert |
| 6,398,313 | B1 | * | 6/2002 | Lew ......................... 301/95.102 |
| 2005/0035494 | A1 | * | 2/2005 | Huang .......................... 264/313 |
| 2006/0244304 | A1 | * | 11/2006 | Steinke .................. B29C 39/42 301/64.701 |
| 2009/0143524 | A1 | * | 6/2009 | Nakayama et al. ........... 524/450 |

FOREIGN PATENT DOCUMENTS

| | | |
|---|---|---|
| JP | 02076622 A * | 3/1990 |
| JP | 06-063723 | 3/1994 |
| JP | 09-314301 | 12/1997 |
| KR | 10-2002-0088763 | 11/2002 |
| KR | 10-0653896 | 8/2006 |
| KR | 10-2010-0026005 | 3/2010 |

* cited by examiner

METHOD FOR MANUFACTURING METAL/COMPOSITE HYBRID WHEEL FOR VEHICLE AND METAL/COMPOSITE HYBRID WHEEL MANUFACTURED BY THE SAME

CROSS-REFERENCE TO RELATED APPLICATION

This application claims under 35 U.S.C. §119(a) the benefit of Korean Patent Application No. 10-2010-0079994 filed Aug. 18, 2010, the entire contents of which are incorporated herein by reference.

BACKGROUND (a) Technical Field

The present disclosure relates to a method for manufacturing a wheel for a vehicle. More particularly, it relates to a method for manufacturing a metal/composite hybrid wheel for a vehicle by molding an inner rim of a composite material by compression and, at the same time, bonding an outer rim of a metal material to the inner rim to induce compressive residual stress in the bonding area by a difference in thermal expansion coefficient between the outer rim and the inner rim. The present methods provide an increase in the adhesive strength of the bonding area and the durability of the wheel. The present disclosure further relates to a wheel for a vehicle manufactured by the method, particularly a metal/composite hybrid wheel for a vehicle manufactured by the method.

(b) Background Art

In general, a wheel for a vehicle is connected to the center of a rubber tire in which air or nitrogen is filled and then firmly connected to the axle of the vehicle. An aluminum wheel, which has a good design, excellent cooling efficiency, and improved fuel efficiency due to a low weight, is widely used.

Recently, there has been an increased interest in a metal/composite hybrid wheel using a fiber-reinforced composite material having excellent mechanical properties. Such hybrid wheels have been manufactured by a vacuum bag molding (VBM) method or a resin transfer molding (RTM) method.

As shown in FIG. 1, the vacuum bag molding method includes inserting a material, such as prepreg, into a metal mold, mounting an intermediate mold inside the metal mold, applying a Teflon film onto the resulting mold, wrapping the resulting mold using a breeder, placing the resulting mold in a vacuum bag, absorbing air from the vacuum bag using a vacuum pump, and performing an autoclave molding process, to thus produce the product.

However, the process for manufacturing the product using the vacuum bag molding method is complicated, and expensive materials (such as Teflon film, breeder, etc.) are used. Thus, the vacuum bag molding method is unsuitable for mass production and increases the manufacturing cost.

As shown in FIG. 2, the resin transfer molding method includes disposing dry fiber and preform in a lower mold, connecting an upper mold to the lower mold, pressing or clamping the upper and lower molds, injecting a resin mixed with a catalyst into the resulting mold (e.g. using an RTM machine), curing the resin at room temperature or at a high temperature after the resin is impregnated, and removing the mold, to thus produce the product.

However, when the resin transfer molding method is used, pores are generated in the final product, which reduces the strength. Further, it is difficult to control the quality of the product due to the resulting presence of a resin rich area. As such, is it difficult to ensure uniform quality of the products using a resin transfer molding method.

Further, because both the vacuum bag molding method and the resin transfer molding method for manufacturing a hybrid wheel require various adhesion and bonding processes to integrally mold the outer rim of a metal material and the inner rim of a composite material, these manufacturing processes are very complicated.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a method for manufacturing a wheel, particularly a metal/composite hybrid wheel for a vehicle.

In a preferred embodiment, the present method provides a single process of molding an inner rim of a composite material at a high temperature by compression and, at the same time, bonding an outer rim of a metal material to the inner rim to induce compressive residual stress in the bonding area by a difference in thermal expansion coefficient between the outer rim and the inner rim. The present methods provide an increase in the adhesive strength of the bonding area and the durability of the wheel. The present invention further provides a wheel manufactured by the present method, particularly a metal/composite hybrid wheel for a vehicle manufactured by the present method. Alternatively, in accordance with another embodiment, the outer rim can be fabricated of a composite material and the inner rim fabricated of a metal material, and the method could be suitably carried out so as to mold and bond the inner and outer rims.

In an exemplary embodiment, the present invention provides a method for manufacturing a metal/composite hybrid wheel for a vehicle, the method including: inserting a bonding area of an outer rim into an outer mold to be bonded thereto, the outer rim fabricated of a metal material; inserting or stacking a composite material on the bonding area of the outer rim and an inner circumferential surface of the outer mold; inserting or disposing an intermediate mold within the outer mold and inserting or disposing an inner mold within the intermediate mold to form a mold assembly; and placing the mold assembly into a heating chamber to be heated, wherein the inner rim is compressed and molded and, at the same time, the outer rim and the inner rim are bonded together via the composite material, particularly by the co-cure bonding method with resins (e.g. excessive resins) from the stacked/inserted composite material (e.g. composite prepregs) under a pressure generated by thermal expansion of the intermediate mold.

In a preferred embodiment, the mold assembly is further cooled to room temperature to induce compressive residual stress in the bonding area of the outer rim and the inner rim.

In another preferred embodiment, the intermediate mold is formed of a rubber material.

In still another preferred embodiment, the heating chamber may be heated to a temperature of about 125 to 180° C.

In yet another preferred embodiment, the composite material includes a volume fraction of carbon fibers of about 30 to 75%.

In still yet another preferred embodiment, the carbon fibers may be in the form of fibers in one direction or in the form of woven fibers.

In a further preferred embodiment, the pressure generated by the thermal expansion of the intermediate mold may be controlled by controlling the thickness and/or material of the intermediate mold.

In another further preferred embodiment, the bonding area of the outer rim may include a groove portion to increase the adhesive strength with the inner rim.

The present invention further provides a wheel, preferably a metal/composite hybrid wheel for a vehicle, manufactured by the above-described method.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
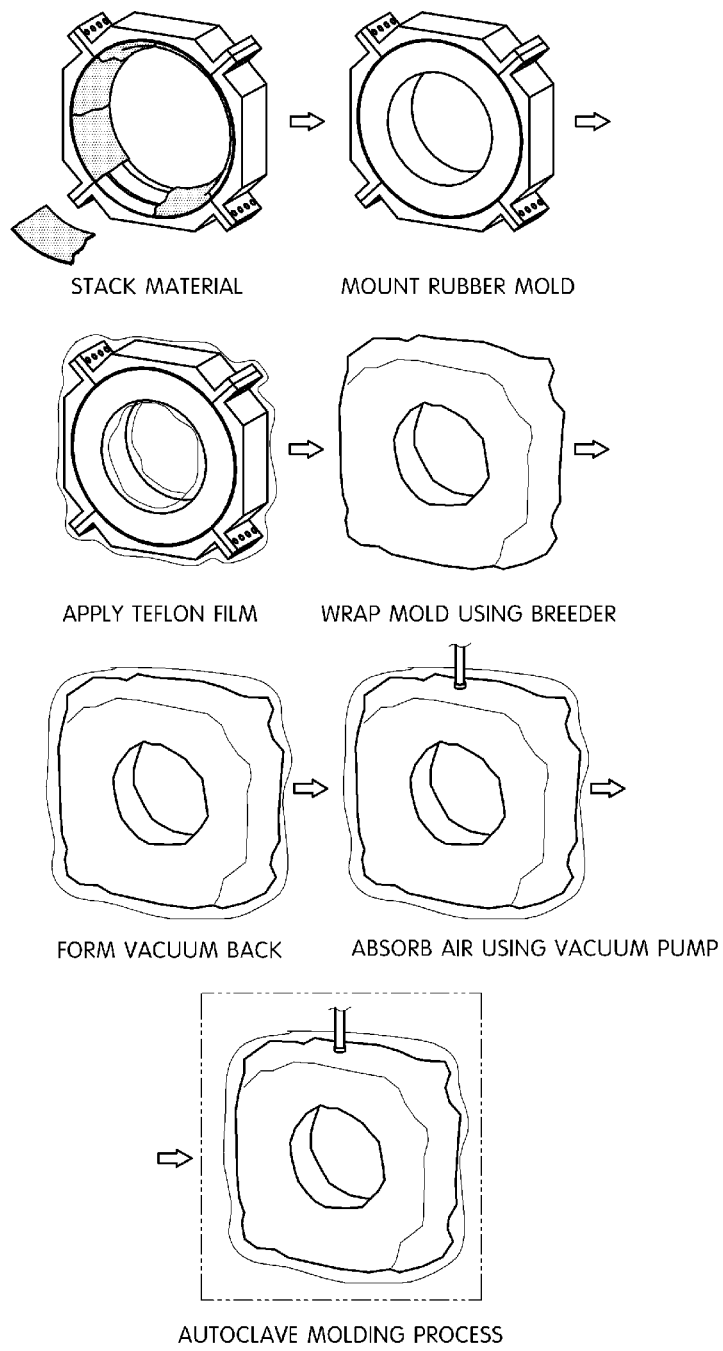
FIG. 1 is a diagram showing a conventional vacuum bag molding method for manufacturing a hybrid wheel.
Figure 2:
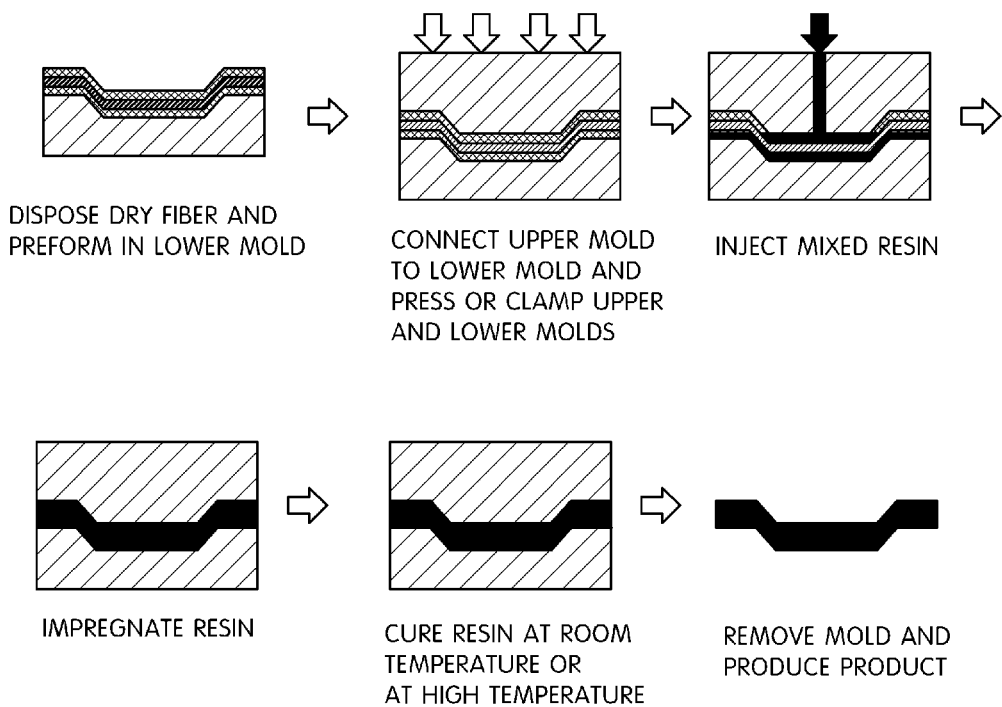
FIG. 2 is a diagram showing a conventional resin transfer molding method for manufacturing a hybrid wheel.

Reference numerals set forth in the Drawings includes reference to the following elements as further discussed below:

| A: mold assembly | C: heating chamber |
|---|---|
| 10: outer rim | 11: groove portion |
| 20: inner rim | 100: outer mold |
| 200: intermediate mold | 300: inner mold |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a method for manufacturing a wheel, particularly a metal/composite hybrid wheel for a vehicle, by molding an inner rim 20 of a first material by compression and, at the same time, bonding an outer rim 10 of a second material to the inner rim 20 to induce compressive residual stress in the bonding area by a difference in thermal expansion coefficient between the outer rim 10 and the inner rim 20. Preferably the first and second materials are selected from composite materials and metal materials, more preferably wherein the first material is a composite material and the second material is a metal material. It is noted that the composite and metal materials are not particularly limited, and any composite materials and metal materials known for use in the manufacture of vehicle wheels can suitably be used in the practice of the present invention. The methods of the present invention provide increased the adhesive strength in the bonding area and increased durability of the wheel. The present invention further provides a wheel manufactured by the present method, particularly a metal/composite hybrid wheel for a vehicle manufactured by the present method.

An exemplary method for manufacturing a metal/composite hybrid wheel for a vehicle according to the present invention will further be described in detail with reference to the accompanying drawings below.

Figure 4:
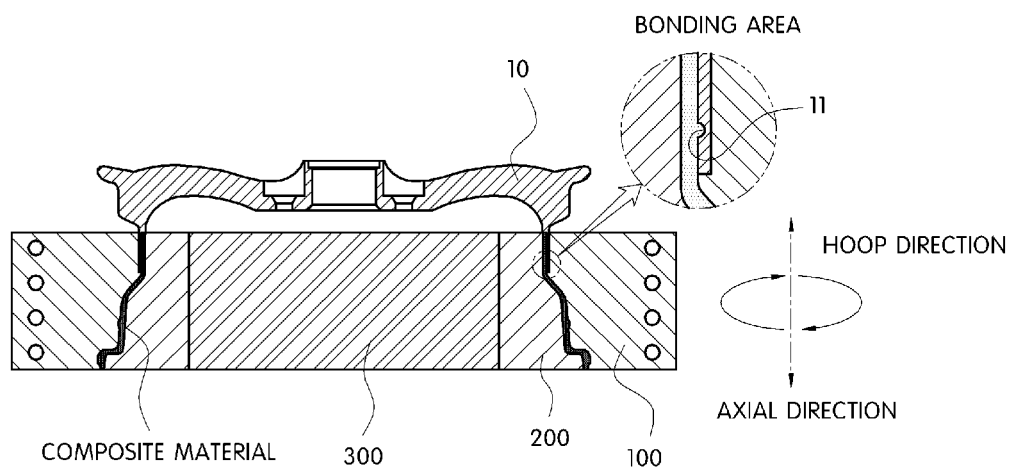
FIG. 4 is a diagram showing a mold assembly formed during the manufacturing method in accordance with an embodiment of the present invention.
Figure 5:
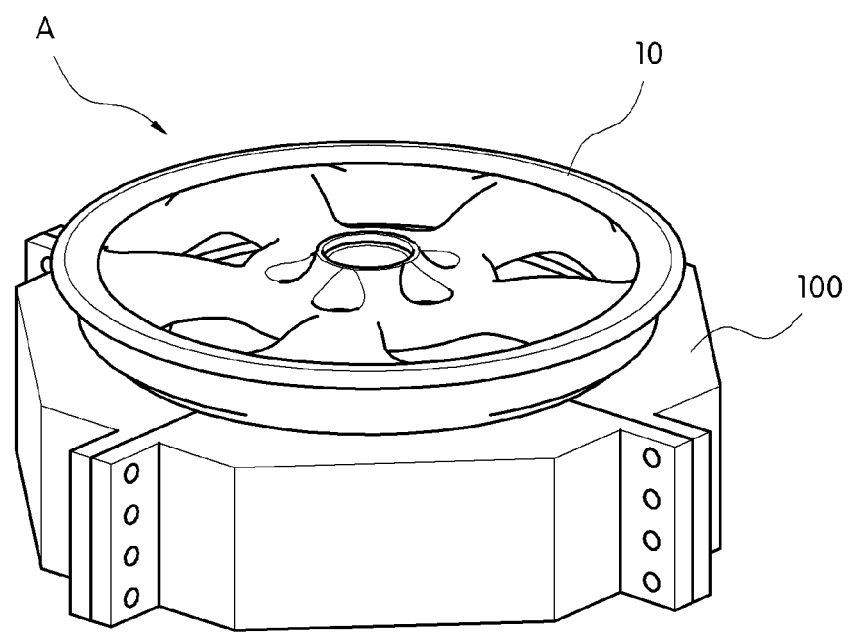
FIG. 5 is a diagram showing a mold assembly formed during the manufacturing method in accordance with an embodiment of the present invention.

In accordance with the exemplary embodiment for the manufacture of a metal/composite hybrid wheel, as shown in FIG. 4, an outer mold 100, preferably fabricated of a metal material, having an outer shape of the wheel on its inner circumferential surface, an intermediate mold 200 having an inner shape of the wheel on its outer circumferential surface, and an inner mold 300 for supporting the intermediate mold 200 during thermal expansion of the intermediate mold 200 and creating a pressure in the intermediate mold 200 are used.

Figure 3:
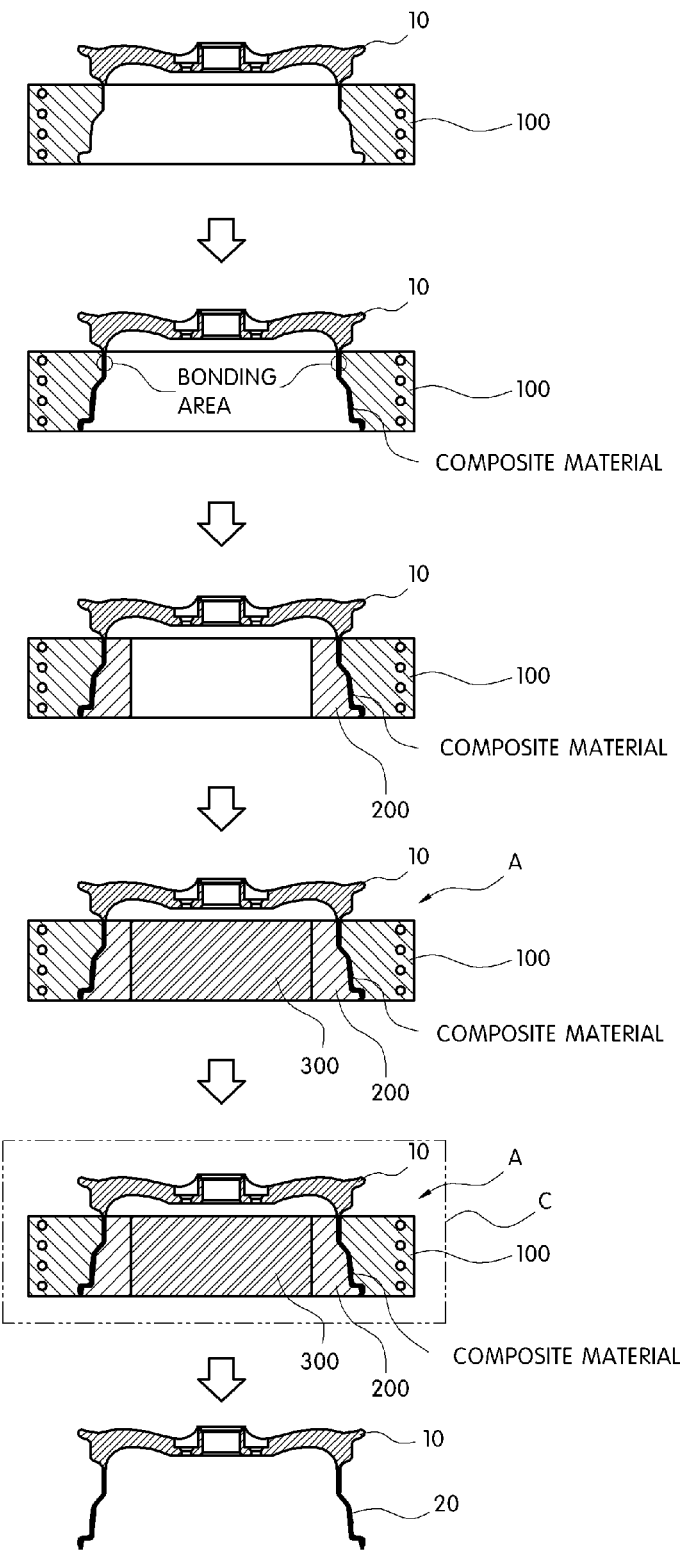
FIG. 3 is a diagram showing a method for manufacturing a metal/composite hybrid wheel for a vehicle in accordance with a preferred embodiment of the present invention.

As shown in FIG. 3, the outer rim 10 of a metal material is mounted to the outer mold 100 in such a manner that a cylindrical bonding area, to which the inner rim 20 is bonded, is closely inserted into the inside of the outer mold 100 and fixed thereto (shown in greater detail, for example, in FIG. 4).

Next, a composite material for molding the inner rim 20 is inserted into the outer mold 100 and is preferably uniformly stacked on the overall bonding area of the outer rim 10 and the inner circumferential surface of the outer mold 100 (see also FIG. 4) without a carrier. In particular, the composite material can be directly laminated on the overall bonding area of the outer rim 10 and the inner circumferential surface of the outer mold 100 without an intermediate layer, such as a bonding layer.

Then, the intermediate mold 200 is inserted into the inside of the outer mold 100 and is preferably is fixed to prevent movement, and the inner mold 300 is inserted into the inside of the intermediate mold 200 such that the intermediate mold 200 is in indirect contact with the outer mold 100, thereby forming a metal assembly A.

The metal assembly A is placed in a heating chamber C, which is preheated to a temperature at which the composite material is molded into a desired shape (for example, preferred temperatures can include those ranging from about 125 to 180° C.), so as to be heated.

In preferred embodiments, the composite material contains a thermosetting resin, which is increasingly crosslinked and cured by heat and, thus, is not transformed even when a large force is applied. It is further preferred that the intermediate mold 200 is formed of a material, such as a rubber material, having a high thermal expansion coefficient so as to move in a radius direction by thermal expansion (e.g. see FIG. 6).

Therefore, as the metal assembly A is placed in the heating chamber C preheated to a suitable temperature, such as about 125 to 180° C., the composite material is thermally cured, and the intermediate mold 200 is heated by the heat and thermally expanded in a radius direction.

In particular, the composite material is molded by placing the mold assembly A in the heating chamber C to be heated, and the intermediate mold 200 compresses the composite material into the inner rim shape by pressure created by the thermal expansion.

Figure 6:
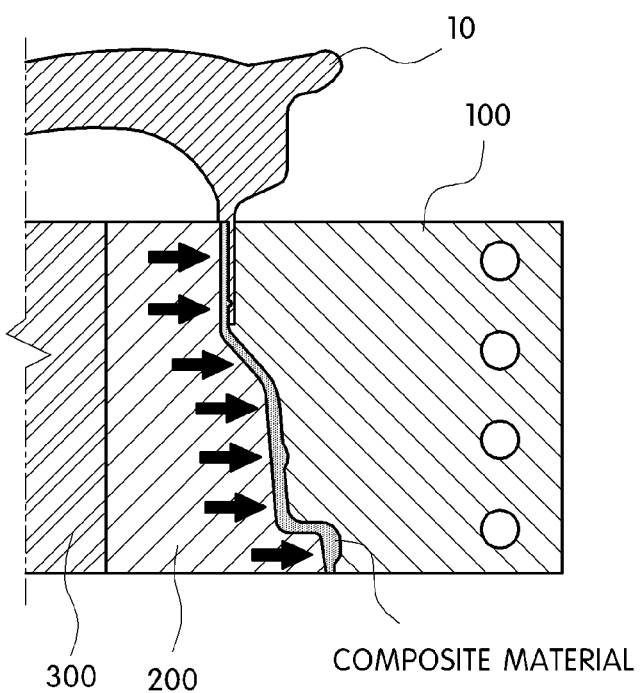
FIG. 6 is a diagram showing that a high pressure is uniformly applied to a composite material and an outer mold by thermal expansion of an intermediate mold during the manufacturing method in accordance with an embodiment of the present invention.

In preferred embodiments in accordance with the present invention, the thermal expansion of the rubber intermediate mold 200 applies a uniform and high pressure to the composite material and the outer mold 100 as shown in FIG. 6, and this pressure, which is higher than the molding pressure of a typical composite material, compresses the composite material and molds the bonding area (where the outer rim and the inner rim are bonded together) of the metal/composite hybrid wheel.

In certain embodiments, if the bonding area of the outer rim is surface-treated (e.g. with sandpaper or the like), the adhesive strength of the bonding area with the inner rim of the composite material can be further increased.

In yet further embodiments of the present invention, it is possible to provide an appropriate pressure according to process conditions (e.g., the type of the composite material) by controlling the thickness and/or the thermal expansion coefficient of the intermediate mold 200 to control the compaction pressure due to the thermal expansion of the intermediate mold 200.

The manufacturing method of the present invention beneficially does not require adhesion and bonding processes to integrate the outer rim 10 of the metal material and the inner rim 20 of the composite material (e.g. after a process wherein the inner rim 20 is molded separately) and, thus, the present methods allow for the manufacture of a metal/composite hybrid wheel by a simplified molding process.

Further, in metal/composite hybrid wheels manufactured in accordance with the present methods, the compressive residual stress is induced in the bonding area of the outer rim 10 and the inner rim 20 by a difference in thermal expansion coefficient between the metal material and the composite material in a "hoop direction", i.e., in the circumferential direction of the cylindrical bonding area, and thus the adhesive strength of the bonding area where the outer rim 10 and the inner rim 20 are bonded together is increased. Furthermore, the compressive residual stress inside the hybrid wheel can increase the structural fatigue life of the wheel, thereby increasing the durability of hybrid wheels of the present invention.

In accordance with preferred embodiments, the manufacturing method of the present invention further includes removing the heated mold assembly A from the heating chamber C and cooling the mold assembly A to a temperature, for example room temperature, that induces the compressive residual stress. As referred to herein, room temperature means a temperature of about 20 to 30° C.

In accordance with an exemplary method of manufacturing of the metal/composite hybrid wheel according to the present invention, the curing cycle of the wheel is as follows: the mold assembly A which has been cooled to a temperature, such as room temperature (e.g., at 25° C.), is heated to an increased temperature (for example, about 125 to 180° C.), at which the composite material is molded; and is then cooled, for example to room temperature, such that a temperature difference of more than about 100° C. occurs during the cooling process.

Figure 7:
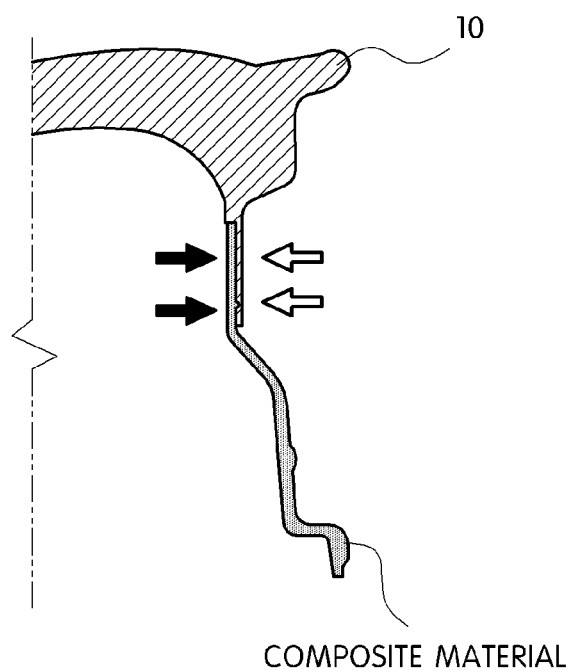
FIG. 7 is a diagram showing compressive residual stress induced in a bonding area by a difference in thermal expansion coefficient between a composite material and a metal material during the manufacturing method in accordance with an embodiment of the present invention.
Figure 8:
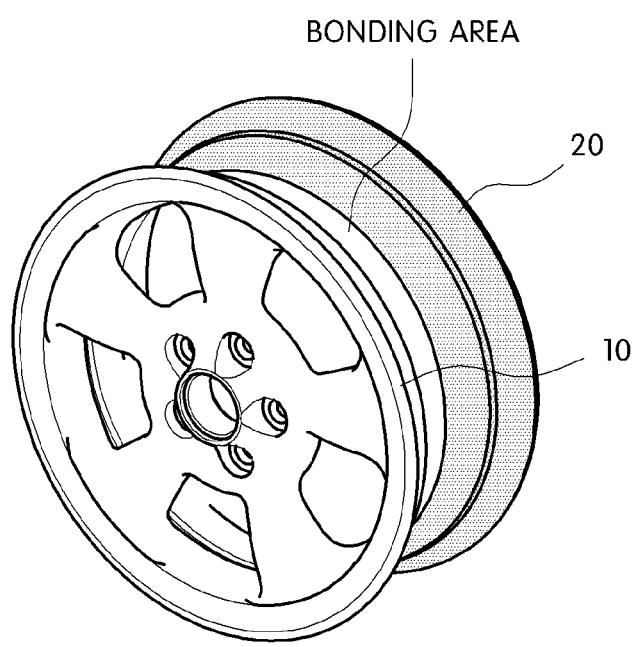
FIG. 8 is a metal/composite hybrid wheel manufactured by a method in accordance with an embodiment of the present invention.

According to the manufacturing method of the present invention, it is possible to induce the compressive residual stress as shown in FIG. 7 in the bonding area of the metal-composite hybrid wheel by a difference between the molding temperature of the composite material and the cooling temperature (e.g. room temperature) by cooling the heated mold assembly A to the cooling temperature (e.g. room temperature). As a result, the adhesive strength between the outer rim 10 and the inner rim 20 is increased.

In embodiments of the present invention, the internal pressure P generated by the compressive residual stress induced in the bonding area of the metal/composite hybrid wheel can be calculated by the following formula 1:

$$\varepsilon_\theta = \frac{[\sigma_\theta - v(\sigma_Z + \sigma_R)]}{E} + \alpha \Delta T = \frac{\sigma_\theta}{E} + \alpha \Delta T \quad \text{[Formula 1]}$$

$$(\varepsilon_\theta)_C = \frac{-Pr_A}{E_C t_C} + \alpha_C \Delta T = \frac{\delta}{r_C}$$

$$\delta = r_C \left( \frac{-Pr_A}{E_C t_C} + \alpha_C \Delta T \right) = r_A \left( \frac{Pr_A}{E_A t_A} + \alpha_A \Delta T \right)$$

$$\Delta T r_C (r_C \alpha_C - r_A \alpha_A) = P \left( \frac{r_A r_C}{E_C t_C} + \frac{r_C^2}{E_A t_A} \right)$$

$$P = \frac{\Delta T (r_C \alpha_C - r_A \alpha_A)}{\left( \frac{r_A r_C}{E_C t_C} + \frac{r_A^2}{E_A t_A} \right)}$$

wherein $\varepsilon_\theta$ represents the strain in the hoop direction and $(\varepsilon_\theta)_C$ represents the strain in the hoop direction (i.e. circumferential direction) of the composite material.

In preferred embodiments, the composite material has a volume fraction of carbon fibers of about 30 to 75%. In an exemplary embodiment, the composite material contains carbon fibers with a volume fraction of about 30 to 75% and polymer resin with a volume fraction of about 25 to 70%. In certain embodiments, the carbon fibers are in the form of fibers in one direction or in the form of woven fibers, and the polymer resin is a thermosetting resin such as epoxy, polyester, etc.

The hardness and strength of the composite material can vary according to the type of the carbon fiber, and thus it is possible to control the residual thermal stress induced in the bonding area of the aluminum and composite material by stacking or inserting the composite material at an appropriate angle with respect to the hoop direction (i.e. circumferential direction) of the wheel. It has been found that if the carbon fibers are stacked in the hoop direction, the residual thermal stress induced in the bonding area of the aluminum outer rim 10 can be maximized, and thus it is preferable that the carbon fibers be stacked in the hoop direction. In embodiments wherein a woven carbon fiber composite material is used, it is preferable that the carbon fibers in the longitudinal direction be stacked in the hoop direction of the wheel.

Metal materials used in fabricating rims of the invention, preferably the outer rim 10, can be any metal materials conventionally used and can be selected from, for example, aluminum, magnesium, titanium, etc. The composite material can also be any such materials conventionally used, and preferably the inner rim 20 is molded using a composite material containing a fiber-reinforced composite material as mentioned above.

In accordance with a preferred manufacturing method of the present invention, one or more grooves, such as a concave groove portion 11 as shown in FIG. 4, is formed in the bonding area of the outer rim 10. Therefore, when the composite material is molded by compression and, at the same time, when the inner rim 20 and the outer rim 10 are bonded together, the adhesive strength of the bonding area of the hybrid wheel can be increased and the torque in the hoop direction can be more smoothly transmitted. In particular, due to the one or more grooves, such as groove portion 11, formed in the bonding area of the outer rim 10, a portion of the composite material for molding the bonding area of the inner rim 20 is inserted into the grooves/groove portion 11 and is cured, thereby increasing the adhesive strength of the bonding area of the hybrid wheel.

Further, when the metal/composite hybrid wheel of the present invention is manufactured by molding and bonding the outer rim 10 and the inner rim 20, which are formed of different materials, by co-cure bonding in the above-described manner, the metal/composite hybrid wheel may be composed of an outer rim 10 of a composite material and an inner rim 20 of a metal material.

In this case, for example, the inner rim 20 of the metal material can be stacked on the outer circumference of the bonding area of the outer rim 10 such that at least a portion of the metal material of the inner rim 20 is located outside and at least a portion of the composite material of the outer rim 10 is located inside, and thus it is possible to induce compressive residual stress in the bonding area of the final molded product.

It is also possible in some embodiments to use an appropriate composite material such that the compressive residual stress is induced even when the composite material is located inside the metal material.

According to the method for manufacturing the metal/composite hybrid wheel of the present invention, the outer rim of a first material (e.g. metal material) and the inner rim of a second material (e.g. composite material) are molded and bonded together by co-cure bonding, and thus it is possible to reduce the manufacturing costs, simply the manufacturing process, and facilitate the mass production.

Moreover, when a uniform pressure is applied by the thermal expansion of the intermediate mold, it is possible to manufacture a metal/composite hybrid wheel having an excellent quality. In particular, with the compressive residual stress induced in the bonding area of the final molded product, it is possible to increase the adhesive strength of the bonding area, thereby increasing the durability of the hybrid wheel. As a result, the product manufactured by the method of the present invention has excellent mechanical properties.

As described above, according to the method for manufacturing the metal/composite hybrid wheel of the present invention, the molding of the inner rim of a composite material is made at the same time with the molding of the bonding area of the outer rim and the inner rim, and thus it is possible to simplify the manufacturing process and facilitate the mass production. Moreover, according to embodiments of the invention, after the molding process is carried out at a high temperature, the temperature is reduced (e.g. to room temperature), and thus compressive residual stress is induced in the hoop (circumferential) direction in the bonding area of the outer rim and the inner rim by a difference in thermal expansion coefficient between the outer rim of the metal material and the inner rim of the composite material to increase the adhesive strength of the bonding area and the fatigue life of the product, thereby increasing the durability of the hybrid wheel.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a metal/composite hybrid wheel for a vehicle, the method comprising:
   inserting only a cylindrical bonding area of an outer rim of a metal material into an outer mold to be bonded thereto, the cylindrical bonding area being a portion of the outer rim;
   stacking a composite material for molding an inner rim on an outer circumference of the cylindrical bonding area of the outer rim and an inner circumferential surface of the outer mold, and then inserting an intermediate mold into the inside the outer mold and inserting an inner mold fully into the inside the intermediate mold to form a mold assembly; and
   placing the mold assembly into a heating chamber to be heated,
   wherein the inner rim is compressed and molded by a pressure generated by thermal expansion of the intermediate mold, and, a the same time, the cylindrical bonding area of the outer rim is bonded to only at least a portion of the composite material of the inner rim as the portion of the composite material of the inner rim being stacked on the outer circumference of the cylindrical bonding area of the outer rim, such that the portion of the composite material of the inner rim is located on an inner side of the cylindrical bonding area of the outer rim,
   wherein the mold assembly is cooled to room temperature to induce compressive residual stress in the bonding area of the outer rim and the inner rim,
   wherein only the cylindrical bonding area from the outer rim is located inside the outer mold so as to be in contact with the portion of the composite material of the inner rim.

2. The method of claim 1, wherein the mold assembly is cooled to room temperature to induce compressive residual stress in the bonding area of the outer rim and the inner rim.

3. The method of claim 1, wherein the intermediate mold is formed of a rubber material.

4. The method of claim 1, wherein the heating chamber is heated to a temperature of 125 to 180° C.

5. The method of claim 1, wherein the composite material of the inner rim has a volume fraction of carbon fibers of 30 to 75%.

6. The method of claim 5, wherein the carbon fibers are in the form of fibers in one direction or in the form of woven fibers.

7. The method of claim 1, wherein the pressure generated by the thermal expansion of the intermediate mold is controlled by controlling the thickness or material of the intermediate mold.

8. The method of claim 1, wherein the bonding area of the outer rim comprises a groove portion to increase the adhesive strength with the inner rim.

9. A method for manufacturing a hybrid wheel for a vehicle, the method comprising:
   providing an outer rim of a first material, the outer rim having a bonding area;
   inserting the bonding area into an outer mold;
   disposing a second material different than the first material on the bonding area and on an inner circumferential surface of the outer mold;
   inserting an intermediate mold within the outer mold and inserting an inner mold within the intermediate mold to form a mold assembly, wherein the bonding area and second material are disposed between the intermediate mold and the outer mold;
   placing the mold assembly into a heating chamber; and
   heating the mold assembly, whereby the second material is compressed and molded to form an inner rim and, at the same time, the bonding area of the outer rim is bonded to only a portion of the inner rim,
   wherein only the bonding area from the outer rim is located inside the outer mold so as to be in contact with the portion of the inner rim.

10. The method of claim 9 wherein the outer rim and the inner rim are bonded together by a pressure generated by thermal expansion of the intermediate mold.

11. The method of claim 9 wherein the first and second materials are selected from metal materials and composite materials, wherein the first and second materials are different.

* * * * *